Patented July 15, 1947

2,424,111

UNITED STATES PATENT OFFICE 2,424,111

CERAMIC PRODUCTS

Louis Navias, Schenectady, and Robert L. Green, Scotia, N. Y., assignors to General Electric Company, a corporation of New York No Drawing. Application July 27, 1943,
Serial No. 496,346

9 Claims. (Cl. 106—39)

The present invention comprises improved molded and heat-converted dielectric and insulating material. It is suitable for a variety of uses, being particularly well adapted for use in the high frequency field. For the present purposes, a range of frequencies of about 300 to about 1000 kilocycles per second is to be understood as a high frequency range.

As a consequence of the present invention dielectric and insulating materials are provided which are capable of functioning with high efficiency when forming part of radio apparatus. Dielectric elements of high dielectric constants for capacitors are provided.

The power factor of the new products herein described may be made extremely low, ordinarily being no higher than about one-tenth of one per cent in the high frequency range. In some cases power factors as low as 0.02 per cent are readily obtained. Other characteristics of these products—depending on the choice of specific compositions—are high dielectric constants, low temperature coefficient of capacity and high electric breakdown strengths.

Products made by the practice of our invention consist preponderantly of a refractory body material which may be chosen from the class comprising talc (magnesium silicate), titania, zirconia, zirconium silicate, magnesium zirconium silicate and titanates other than alkali metal titanate. Any of such materials, or a combination thereof, may constitute at least about 70 per cent of the new ceramic products provided by the present invention.

Other ingredients employed in the manufacture of ceramic products embodying our invention consist of fluorides of non-alkali metal and clay. While a small amount of material, such as cryolite, which contains an alkali fluoride, may be tolerated, such materials raise the power factor of the product. The term "clay" is intended herein to include the various modifications of hydrated aluminum silicates. Silica either is absent or, in any event, is present in amounts not substantially greater than about one per cent. The non-alkali fluorides preferred for the present purposes are the fluorides of lead or of the alkaline earth metals, which includes the fluorides of calcium, barium, strontium and magnesium. These modifying ingredients function to reduce the heat conversion temperatures to values materially lower than the fusion temperatures of the refractory ingredients.

In carrying out our invention the chosen refractory body material is reduced to a finely divided state as by ball milling in water. It is mixed thereupon with chosen amounts of finely divided fluoride and clay by further wet milling. The resulting slip is filtered, and the filter cakes are dried and pulverized. The powder is dampened with water and molded into articles of desired configuration. The molded articles upon drying are fired in a suitable furnace to a conversion temperature, ordinarily about 1175° to 1275° C. A gas-fired tunnel kiln, such as used in the firing of porcelain ware, is suitable for carrying out the heat conversion of all compositions containing barium or lead fluorides, and also with some compositions containing calcium fluoride.

All compositions herein described which are fired under these conditions become homogeneous, dense, and non-porous. The electrical characteristics of the heat-converted products are measured in the "dry" state, and after soaking in water—as is common in the electrical testing laboratories. Under these conditions the characteristics remain substantially unchanged. Power factor and dielectric constant values herein given were measured at one megacycle.

During the firing step the refractory body material and the fluoride and clay interact and chemically combine with one another in such a way as to produce a dense, non-porous product in which glassy inclusions are substantially absent or at least imperceptible. It is believed to be the homogeneity of the products which is responsible for their low power factor and low hygroscopicity.

The following examples will illustrate our invention, parts in all cases being by weight:

Example 1

Insulators suitable for use in radio apparatus may be made up of the following constituents: talc (steatite) 70 to 90 parts, a fluoride of a non-alkali metal 5 to 15 parts, clay 5 to 20 parts. The clay may be partially or wholly replaced by hydrated alumina.

Preferred fluoride constituents are calcium fluoride, barium fluoride or lead fluoride. Auxiliary additions, such as lead oxide or lead silicate, have been found to be beneficial in these compositions.

A specific batch composition is made up of the following ingredients:

| | Parts |
|---|---|
| Talc | 84 |
| Barium fluoride | 10 |
| Clay | 6 |

The power factor of a fired insulator made from such composition is 0.08 per cent. The dielectric constant is 6.6.

Example 2

Molded products suitable for use as capacitor dielectric elements may be prepared by firing compositions containing from 48 to 80 parts of magnesium titanate, 17 to 0 parts of titania and 0 to 30 parts of steatite, about 5 to 10 parts of fluoride, for example barium or lead fluoride, and 5 to 20 parts of clay. The refractory constituents constitute about 70 to 90 per cent of the entire composition.

Heat-converted products such as described in Example 2 have power factors less than 0.1 per cent, a dielectric constant of about 14, and a temperature coefficient of capacity which can be adjusted over the range of +0.02 to —0.02 per cent per one degree centigrade by adjusting the content of titania with respect to the titanate.

One composition of Example 2 is the following:

|  | Parts |
|---|---|
| Magnesium titanate ($MgTiO_3$) | 70 |
| Titania ($TiO_2$) | 10 |
| Lead fluoride ($PbF_2$) | 10 |
| Clay | 10 |

Another composition is as follows:

|  | Parts |
|---|---|
| Magnesium titanate | 69 |
| Titania | 11 |
| Lead fluoride | 5 |
| Talc | 5 |
| Clay | 10 |

The power factor of the latter composition is 0.05 per cent, the dielectric constant is 14, and the temperature coefficient of capacity is +0.003 per cent per degree centigrade.

Example 3

Heat-converted products having even higher dielectric constant may be made from compositions comprising by weight about 35 to 49 parts zirconia and 40 to 31 parts of titania, together with clay and a suitable fluoride, such as barium fluoride. Dielectric constants of 25 to 40 can be obtained readily.

In some cases the zirconia may be omitted. The compositions may contain about 75 to 90 parts of titania, 0 to 10 parts zirconia, about 5 to 10 parts of a suitable fluoride, and about 5 parts of clay.

The following specific composition has a power factor less than 0.03 per cent, a dielectric constant of 35, and a dielectric strength of 300 volts per mil. (The test sample was one inch in diameter and 50 mils in thickness):

|  | Parts |
|---|---|
| Zirconia | 43 |
| Titania | 32 |
| Barium fluoride | 10 |
| Clay | 15 |

Example 4

A composition containing magnesium zirconium silicate may be made up of the following constituents:

|  | Parts |
|---|---|
| Magnesium zirconium silicate | 44 |
| Titania | 21 |
| Talc | 15 |
| Barium fluoride | 10 |
| Clay | 10 |

This composition when fired has a dielectric constant of 11½ and a power factor of 0.04 per cent.

Example 5

Zirconium silicate (zircon) may replace the zirconia of Example 3 to an extent depending on the properties desired. The following ranges of mixtures are illustrative:

|  | Parts |
|---|---|
| Zircon | 40 to 75 |
| Titania | 40 to 5 |
| Lead or barium fluoride | 10 |
| Clay | 10 |

Example 6

Products having dielectric constants as high as 67 to 90 may be prepared by firing mixtures comprising 75 to 90 parts titania, 0 to 10 parts of zirconia, 5 to 10 parts of a non-alkali fluoride and 5 parts of clay.

A specific mixture of the products of Example 6 has the following composition:

|  | Parts |
|---|---|
| Titania | 85 |
| Zirconia | 5 |
| Barium fluoride | 5 |
| Clay | 5 |

A heat-converted product made from a green batch having this composition has a power factor less than 0.04 per cent and a dielectric constant of 85.2.

Example 7

Products having dielectric constants within the range of 25 to 33 may be prepared from 65 to 80 parts of zirconium titanate and 15 to 0 parts of titania with 10 parts of barium fluoride and 10 parts of clay.

Example 8

Products having dielectric constants as high as 400 to 1500 may be prepared from mixtures of barium, strontium and lead titanates in various proportions together with suitable fluoride and clay. The following mixtures are illustrative of the range of compositions in proportionate parts.

| Barium Titanate $BaTiO_3$ | Strontium Titanate $SrTiO_3$ | Lead Titanate $PbTiO_3$ | Ba or Pb Fluoride $BaF_2$ or $PbF_2$ | Clay |
|---|---|---|---|---|
| 32 to 63 | 17 to 45 | 0 to 16 | 5 to 10 | 5 to 10 |

A heat-converted composition having a power factor of 0.15 per cent and a dielectric constant of 780 may be prepared from the following green mixture:

|  | Parts |
|---|---|
| Barium titanate ($BaTiO_3$) | 56 |
| Strontium titanate ($SrTiO_3$) | 24 |
| Barium fluoride ($BaF_2$) | 10 |
| Clay | 10 |

Example 9

Products may be made from barium titanate, strontium titanate, titania, barium fluoride and clay, the following being examples of compositions and ranges:

| $BaTiO_3$ | $SrTiO_3$ | $TiO_2$ | $BaF_2$ | Clay |
|---|---|---|---|---|
| 43 to 54 | 17 to 21 | 5 to 20 | 5 to 10 | 10 to 15 |

The power factor of these compositions when fired is about 0.05 to 0.4 per cent. The dielectric constant is 75 to 425.

What we claim as new and desire to secure by Letters Patent of the United States, is:

1. A heat-converted product which is suitable for dielectric and insulating purposes comprising by weight about 70 to 90 per cent of refractory material consisting of titanates of alkaline earth metals and at least about 10 per cent of a bonding agent consisting of fluoride chosen from the group consisting of alkaline earth fluorides and lead fluoride and clay.

2. A composition such as covered by claim 1 in which the titanate is in part replaced by titanate.

3. A dielectric and insulating material consisting of the heat-converted product of about 75 to 90 per cent titania, and about 10 to 25 per cent of a mixture of barium fluoride and clay.

4. A composition of the type which is covered by claim 3 in which part of the titania has been replaced by zirconia.

5. Ceramic compositions consisting by weight of at least about 70 per cent of refractory titanium compound, and a bonding agent consisting exclusively of at least about 5% of lead fluoride and at least about 5% of clay, said compositions being heat convertible to a dense, stony product in which glassy inclusions are substantially absent.

6. A heat-converted electric insulating product consisting mainly of refractory titanium compound and an admixture of about 5 to 10 parts clay and 5 to 10 parts barium fluoride by weight, said admixture constituting about 10 to 25 per cent of said product.

7. Moldable compositions consisting by weight of a mixture of at least about 70 per cent of refractory material chosen from the class consisting of titanium oxide, zirconium oxide, zirconium silicate, magnesium zirconium silicate, titanates of alkaline-earth metals, and mixtures thereof, the remainder being clay and fluoride chosen from the group consisting of alkaline earth and lead fluorides.

8. Moldable compositions consisting by weight of at least about 70 per cent of a refractory titanium compound, the remainder being a mixture of clay and fluoride chosen from the group consisting of alkaline earth fluorides and lead fluoride, said composition being capable of heat conversion to a dense, non-porous structure in which glassy inclusions are substantially absent and which is characterized by low power factor and low hygroscopicity.

9. A dielectric and heat-converted insulating product consisting of refractory titanium compound and dispersed ingredients consisting exclusively of fluoride chosen from the group consisting of alkaline earth fluorides and lead fluoride and clay, said product having a power factor less than one-tenth of one per cent in a high frequency field.

LOUIS NAVIAS.
ROBERT L. GREEN.

REFERENCES CITED

The following references are of record in the file of this patent:

UNITED STATES PATENTS

| Number | Name | Date |
| --- | --- | --- |
| 2,026,088 | Harvey et al. | Dec. 31, 1935 |
| 2,220,412 | Kinzie et al. | Nov. 5, 1940 |

FOREIGN PATENTS

| Number | Country | Date |
| --- | --- | --- |
| 429,730 | Great Britain | 1935 |
| 396,532 | Great Britain | 1933 |

Certificate of Correction

Patent No. 2,424,111.

July 15, 1947.

LOUIS NAVIAS ET AL.

It is hereby certified that error appears in the printed specification of the above numbered patent requiring correction as follows: Column 5, lines 15 and 16, claim 2, for "titanate" read *titania*; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*

The power factor of these compositions when fired is about 0.05 to 0.4 per cent. The dielectric constant is 75 to 425.

What we claim as new and desire to secure by Letters Patent of the United States, is:

1. A heat-converted product which is suitable for dielectric and insulating purposes comprising by weight about 70 to 90 per cent of refractory material consisting of titanates of alkaline earth metals and at least about 10 per cent of a bonding agent consisting of fluoride chosen from the group consisting of alkaline earth fluorides and lead fluoride and clay.

2. A composition such as covered by claim 1 in which the titanate is in part replaced by titanate.

3. A dielectric and insulating material consisting of the heat-converted product of about 75 to 90 per cent titania, and about 10 to 25 per cent of a mixture of barium fluoride and clay.

4. A composition of the type which is covered by claim 3 in which part of the titania has been replaced by zirconia.

5. Ceramic compositions consisting by weight of at least about 70 per cent of refractory titanium compound, and a bonding agent consisting exclusively of at least about 5% of lead fluoride and at least about 5% of clay, said compositions being heat convertible to a dense, stony product in which glassy inclusions are substantially absent.

6. A heat-converted electric insulating product consisting mainly of refractory titanium compound and an admixture of about 5 to 10 parts clay and 5 to 10 parts barium fluoride by weight, said admixture constituting about 10 to 25 per cent of said product.

7. Moldable compositions consisting by weight of a mixture of at least about 70 per cent of refractory material chosen from the class consisting of titanium oxide, zirconium oxide, zirconium silicate, magnesium zirconium silicate, titanates of alkaline-earth metals, and mixtures thereof, the remainder being clay and fluoride chosen from the group consisting of alkaline earth and lead fluorides.

8. Moldable compositions consisting by weight of at least about 70 per cent of a refractory titanium compound, the remainder being a mixture of clay and fluoride chosen from the group consisting of alkaline earth fluorides and lead fluoride, said composition being capable of heat conversion to a dense, non-porous structure in which glassy inclusions are substantially absent and which is characterized by low power factor and low hygroscopicity.

9. A dielectric and heat-converted insulating product consisting of refractory titanium compound and dispersed ingredients consisting exclusively of fluoride chosen from the group consisting of alkaline earth fluorides and lead fluoride and clay, said product having a power factor less than one-tenth of one per cent in a high frequency field.

LOUIS NAVIAS.
ROBERT L. GREEN.

REFERENCES CITED

The following references are of record in the file of this patent:

UNITED STATES PATENTS

| Number | Name | Date |
| --- | --- | --- |
| 2,026,088 | Harvey et al. | Dec. 31, 1935 |
| 2,220,412 | Kinzie et al. | Nov. 5, 1940 |

FOREIGN PATENTS

| Number | Country | Date |
| --- | --- | --- |
| 429,730 | Great Britain | 1935 |
| 396,532 | Great Britain | 1933 |

Certificate of Correction

Patent No. 2,424,111.

July 15, 1947.

LOUIS NAVIAS ET AL.

It is hereby certified that error appears in the printed specification of the above numbered patent requiring correction as follows: Column 5, lines 15 and 16, claim 2, for "titanate" read *titania*; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*